United States Patent
Campbell (12)

(10) Patent No.: US 6,915,761 B1
(45) Date of Patent: Jul. 12, 2005

(54) WEATHERPROOF PET FEEDER

(76) Inventor: Glenda Gail Campbell, 101 Perdue La., Weatherford, TX (US) 76085

( * ) Notice: Subject to any disclaimer, the term of this patent is extended or adjusted under 35 U.S.C. 154(b) by 0 days.

(21) Appl. No.: 10/730,563

(22) Filed: Dec. 8, 2003

(51) Int. Cl.[7] .................. A01K 1/10; A01K 39/00; A01K 5/00
(52) U.S. Cl. .................. 119/51.01; 119/61.52; 119/73; 119/72; 119/74; 119/76; 119/61.5; 119/61.3
(58) Field of Search .............. 119/410, 414, 469, 119/470, 475, 73, 72, 74, 76, 61.5, 61.53, 119/61.52, 61.56, 61.3, 61.1, 51.12, 51.01; D30/121–133

(56) References Cited

U.S. PATENT DOCUMENTS

| | | | | |
|---|---|---|---|---|
| 1,257,211 A | * | 2/1918 | Frost | 119/73 |
| 2,492,604 A | * | 12/1949 | Townsend | 119/72 |
| 2,682,255 A | * | 6/1954 | Kleeman | 119/51.01 |
| 2,781,607 A | * | 2/1957 | Smiley | 43/131 |
| 2,841,116 A | * | 7/1958 | Nichols et al. | 119/53 |
| 2,845,896 A | * | 8/1958 | Copeland | 119/51.01 |
| 2,865,326 A | * | 12/1958 | Lowe, Jr. | 119/52.2 |
| 2,944,364 A | * | 7/1960 | Kelly | 43/131 |
| 3,324,833 A | * | 6/1967 | Clugston | 119/61.3 |
| 3,654,904 A | * | 4/1972 | Kreuger | 119/469 |
| 3,763,825 A | * | 10/1973 | Fleming | 119/51.12 |
| 3,995,595 A | | 12/1976 | Williams | |
| 4,029,051 A | * | 6/1977 | McKinney | 119/52.4 |
| 4,334,501 A | * | 6/1982 | McDaniel et al. | 119/482 |
| 4,561,384 A | | 12/1985 | Liff | |
| 4,860,691 A | * | 8/1989 | Mayer | 119/51.5 |
| 4,974,546 A | * | 12/1990 | Burgett | 119/469 |
| 5,054,431 A | * | 10/1991 | Coviello | 119/61.56 |
| 5,148,626 A | * | 9/1992 | Haake, Sr. | 43/121 |
| 5,156,113 A | | 10/1992 | Sextro | |
| 5,222,990 A | * | 6/1993 | Elliott | 119/51.5 |
| 5,231,953 A | * | 8/1993 | Garrett | 119/61.52 |
| D340,552 S | | 10/1993 | Smith | |
| D362,089 S | | 9/1995 | Moore et al. | |
| D391,692 S | * | 3/1998 | Seier | D30/121 |
| 5,884,582 A | * | 3/1999 | Duckworth | 119/61.56 |

(Continued)

FOREIGN PATENT DOCUMENTS

DE 330770 A1 * 7/1984 ............ A01K 5/01

(Continued)

Primary Examiner—Peter M. Poon
Assistant Examiner—Andrea M. Valenti
(74) Attorney, Agent, or Firm—Mark W. Handley; Chauza & Handley, L.L.P.

(57) ABSTRACT

A weatherproof pet feeder (12) has an enclosure (14) pivotally mounted to a feeder base (16) by a hinge (18). Latches (22) secure the enclosure (14) in a downward position on the feeder base (16). The feeder base (16) as two bowl sockets (34, 36). The bowl socket (34) has an electric heater coil (58) for heating a water bowl (38). The feeder base (16) is raised above a ground surface on support legs (44). The support legs (44) have mounting feet (46), tubular leg sections (72) and insecticide bands (96). The support legs (44) are sealed on lower ends by nipples (48) for containing weighting material which prevents the weatherproof feeder (12) from being overturned. The feeder base (16) has tie down loops (52) and the mounting feet (46) have apertures (86) for receiving stakes (88) for securing the weatherproof pet feeder (12) to the ground surface.

20 Claims, 4 Drawing Sheets

U.S. PATENT DOCUMENTS

| | | | |
|---|---|---|---|
| 6,408,788 B1 * | 6/2002 | Lieb et al. | 119/52.2 |
| 6,467,433 B1 * | 10/2002 | Stanton et al. | 119/512 |
| 6,557,489 B2 * | 5/2003 | King | 119/51.01 |
| 6,739,284 B1 * | 5/2004 | Olive | 119/74 |

FOREIGN PATENT DOCUMENTS

| | | | | |
|---|---|---|---|---|
| EP | 390245 | * | 10/1990 | A01K 5/01 |
| GB | 2220835 A | * | 1/1990 | A01K 5/00 |

* cited by examiner

WEATHERPROOF PET FEEDER

TECHNICAL FIELD OF THE INVENTION

This invention relates in general to animal feeders, and in particular to an enclosed pet feeder for outdoor use to feed and water small animals.

BACKGROUND OF THE INVENTION

Pet feeders have been provided for supplying feed and water to animals in the outdoors. For small animals, such as dogs and cats, people feeding animals outdoors have generally provided small open containers, such as bowls, into which feed and water have been placed. Foul weather can often contaminate feed left outdoors for small animals. Dry feed can become saturated with moisture, and water may become frozen in cold weather. Insects may also infest feed and water left outdoors for pets.

SUMMARY OF THE INVENTION

A weatherproof pet feeder is provided for feeding small animals outdoors. The weatherproof pet feeder has an enclosure which is pivotally mounted to a feeder base by a hinge. The feeder base has a substantially planer shape which is horizontally disposed. An entrance slot extends into the substantially planar shape of the feeder base to define an entrance section which provides an open forward end of the feeder base for receiving the animal. The feeder base further includes a feeder section having two bowl sockets for receiving a water bowl and a feed bowl. The socket for the water bowl has an electric heater coil. The enclosure has a front opening for receiving the animal and an enclosed rearward end. The enclosure fits over the feeder base with the front opening of the enclosure registering with the entrance slot of the feeder base and the enclosed rearward end of the enclosure fitting over the feeder section of the feeder base. The top of the enclosure has a rearward ridge in the outer surface thereof, slopes downward from the enclosed rearward end, then levels out to a forward ridge located adjacent to the front opening. The front opening has an overhang to prevent rain from entering the enclosure. Latches secure the enclosure in a downward position relative to the feeder base. The feeder base and the enclosure are raised above a ground surface by leg sockets on the feeder base and can be elevated by support legs provided by tubular leg sections which are threadingly coupled together. The quantity of leg sections used for the support legs is selected to determine overall lengths of the support legs. The support legs are sealed on lower ends by seal members and contain a weighting material, such as sand, to prevent the feeder from being overturned. The support legs also have mounting feet which include apertures for receiving stakes for securing the feeder base to the ground. The feeder base also has a plurality of tie down loops for securing the feeder base to the ground. Insecticide bands are provided by adhesive strips which are treated with an insecticide. The insecticide bands are secured to the exterior of the support legs to prevent ants and insects from crawling up the support legs and into the feeder section of the feeder base. The insecticide bands may be replaced after the insecticide becomes ineffective for preventing insects from crawling up the support legs. A storage compartment is provided for storing a power cord and a battery pack within the pet feeder.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
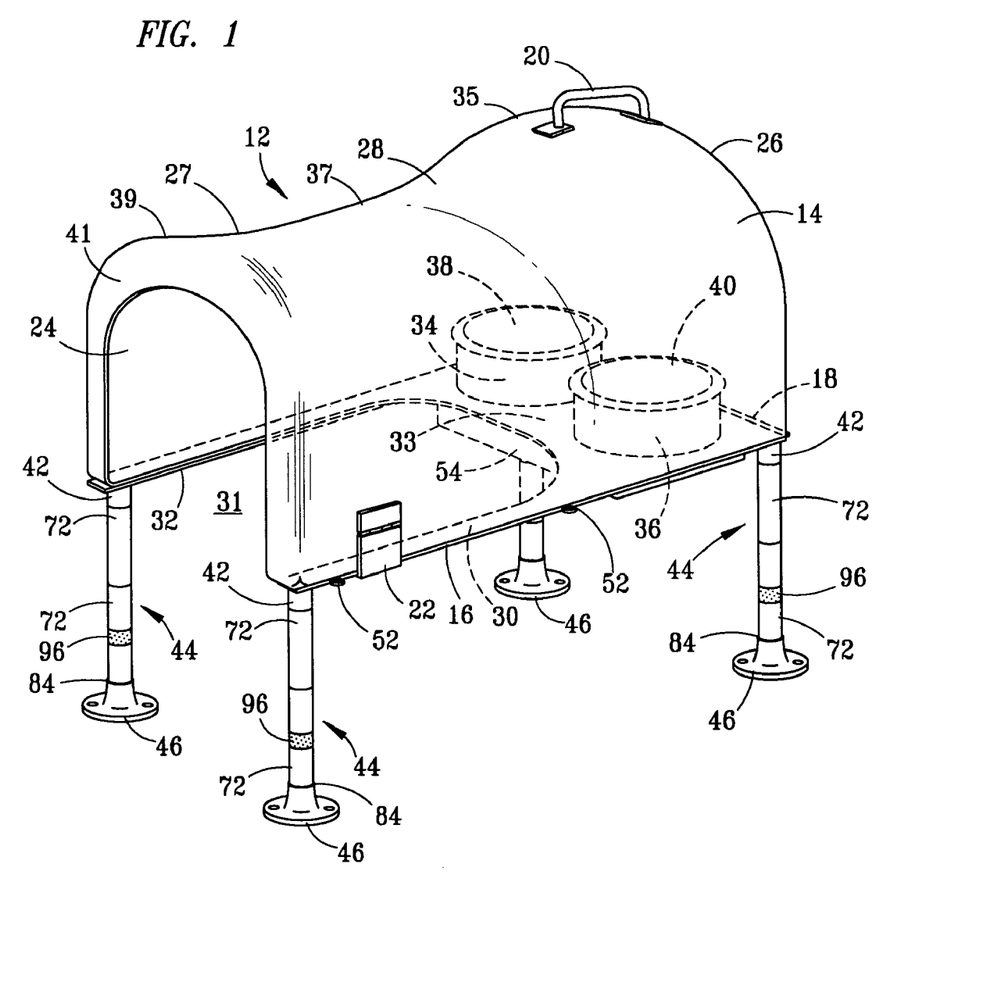
FIG. 1 is a perspective view of a weatherproof pet feeder made according to the present invention, showing an enclosure for the weatherproof pet feeder in a downward, closed position relative to a feeder base.
Figure 2:
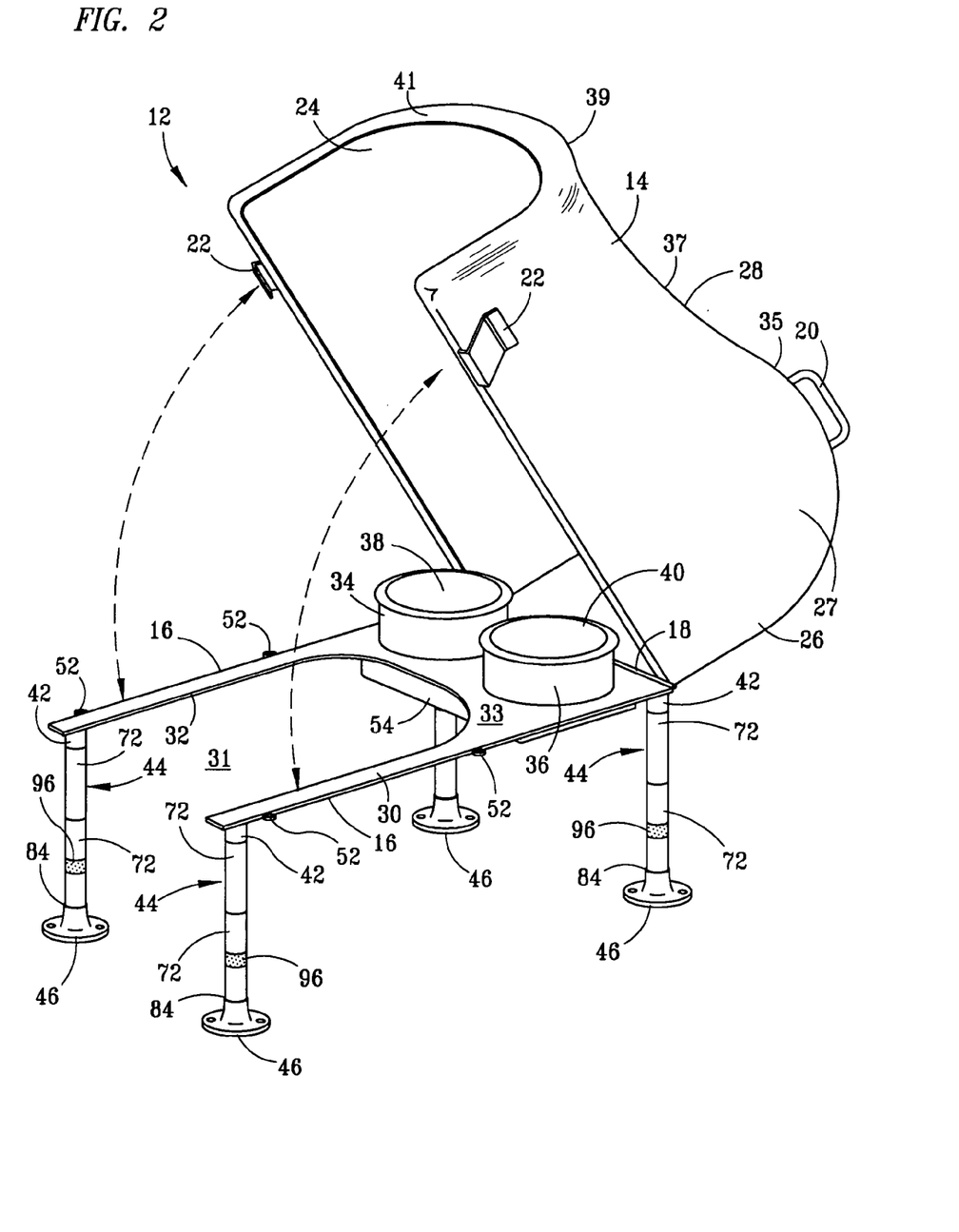
FIG. 2 is a perspective view of the weatherproof pet feeder, showing the enclosure in an upward position relative to the feeder base.

FIGS. 1 and 2 are perspective views of a weatherproof pet feeder 12 having an enclosure 14 pivotally mounted to a feeder base 16. In FIG. 1, the enclosure 14 is shown disposed in a downward, closed position relative to a feeder base 16, and in FIG. 2, the enclosure is shown in an upward position relative to the feeder base 16. The enclosure 14 and the feeder base 16 are preferably formed of molded plastic, but other suitable materials may be used. In the preferred embodiment, the enclosure 14 is formed of a clear or lightly tinted plastic material which allows visual inspection of the amounts of feed and water remaining in the weatherproof pet feeder 12 without requiring that the enclosure 14 be lifted from the feeder base 16. The material of which the enclosure 14 is formed is also preferably a shatterproof, tough, hard-to-break plastic material, such that the enclosure 14 will survive hail storms. A hinge 18 runs the complete length of the back of the feeder base 16 and the enclosure 14, and pivotally mounts the rearward end of the enclosure 14 to the feeder base 16. The hinge 18 has hinge loops and a removable pin pivotally secured within the hinge loops, such that the pin may be easily removed from the hinge loops for disassembly of the enclosure 14 from the feeder base 16. A grip handle 20 is provided on the top of the enclosure 14. Latches 22 are mounted to the sides of a forward portion of the enclosure 14 for engaging the feeder base 16 to secure the enclosure 14 in the downward position relative to the feeder base 16. The weatherproof pet feeder 12 has a front opening 24 and an enclosed rearward end 26.

The enclosure 14 is preferably formed with an arcuately extending exterior surface 27 which provides the appearance of a general igloo shape. The top of the exterior surface 27 defines a crest 28 which longitudinally extends along the length of the enclosure 14, from the enclosed rearward end 26 to the open forward end 24. The enclosed rearward end 26 is of a convex shape disposed above a feeder section 33, and defines a rearward ridge 35 disposed on the crest 28 of the exterior surface 27. The forward portion of the exterior surface 27 of the enclosure 14 is of an upwardly protruding, convex shape defining a forward ridge 39, which is disposed proximately adjacent to the open forward end 24. The forward ridge 39 is disposed at a lower height or elevation than the rearward ridge 35. An intermediate portion 37 of the crest 28 is disposed at a lower elevation than the rearward ridge 35 and the forward ridge 39, as viewed when the enclosure 14 is disposed in the downward position shown in FIG. 1. Thus, the crest 28 of the exterior surface 27 moves forward from the ridge 35 defined by the rearward convex portion of the enclosure 14 at a slight downward slope, levels out at the intermediate portion 37, and then slopes upward at the forward convex portion defining the ridge 39. An overhang 41 extends across the open forward end 24. The overhang 41 curves downward to extend from the exterior surface 27 across the front opening 24 approximately two inches, defining an upper portion of the front opening 24.

The feeder base 16 has a generally planar shape, preferably in the form of a flat plate which has a thickness of one-quarter inch to one-half inch. In the preferred embodiment, the feeder base is formed of a colored, molded plastic capable of withstanding low, direct heat. The entry slot 32 extends into the forward edge of the generally planar shape of the feeder base 16 for two-thirds of the longitudinal length of the feeder base 16 to define a generally U-shaped forward end 30 for the feeder base 16, with sides of the feeder base 16 on opposite sides of the entry slot 32 preferably being one and one-half inches wide to two inches wide. The entry slot 32 provides an open forward end for the feeder base 16, defining an entrance section 31 into which a small animal may walk in reaching the feeder section 33 of the feeder base 16. The feeder section 33 has a longitudinal length which is preferably one third of the longitudinal length of the feeder base 16, and includes two three inch tall bowl sockets 34 and 36, which extend upward from the upward surface of the feeder section 33, and which have diameters that consume most of feeder section 33. The bowl socket 34 is provided for receiving a removable water bowl 38, and the bowl socket 36 is provided for receiving a removable feed bowl 40. The bowl sockets 34 and 36 retain respective ones of the bowls 38 and 40 in position on the feeder base 16 for access by the animal to consume water and feed, respectively. In the preferred embodiment, the removable bowls are Teflon® coated stainless steel, but other suitable materials may be used.

Four downwardly facing support leg sockets 42 are provided in the four corners of the feeder base 16 for receiving support legs 44. The support leg sockets 42 extend approximately two and one-half inches beneath the plane of the lower surface of the feeder base 16, and when the feeder base 16 is used without the support legs 44, the support sockets 42 provide legs for elevating the feeder base 16 from a ground surface. The support legs 44 preferably have upper ends which are threadingly secured to the sockets 42 and lower ends which are secured to mounting feet 46. The support legs 44 preferably include the mounting feet 46, leg sections 72, insecticide bands 96, and nipples 48. The mounting feet 46 are preferably formed as a singular piece, having a broad-based foot with an enclosed lower end and a tubular portion two and one-half inches tall. The insecticide bands 96 are insecticide strips approximately two inches wide, eight and one-quarter inches long, and one-eighth inch thick. An adhesive backing is provided on the back-side of the insecticide bands and is protected by a removable wax paper cover which is removed from the adhesive backing prior to use. The adhesive insecticide strips are wrapped around the leg sections 72 and form bands to prevent insects from crawling up the leg sections 72 and infesting feed and water stored in the feeder section 33. The weatherproof pet feeder comes with one set of insecticide strips. Strips or rolls may be purchased separately. In other embodiments, insecticide couplings may be used, which are included in the support legs 44 to provide insecticide leg sections. The length of the support legs 44 may be changed to accommodate animals of varying sizes within the weatherproof pet feeder 12. Tie down loops 52 are provided on the sides of the feeder base 16 of the weatherproof pet feeder 12 for securing the feeder base 16 to a ground surface.

Figure 3:
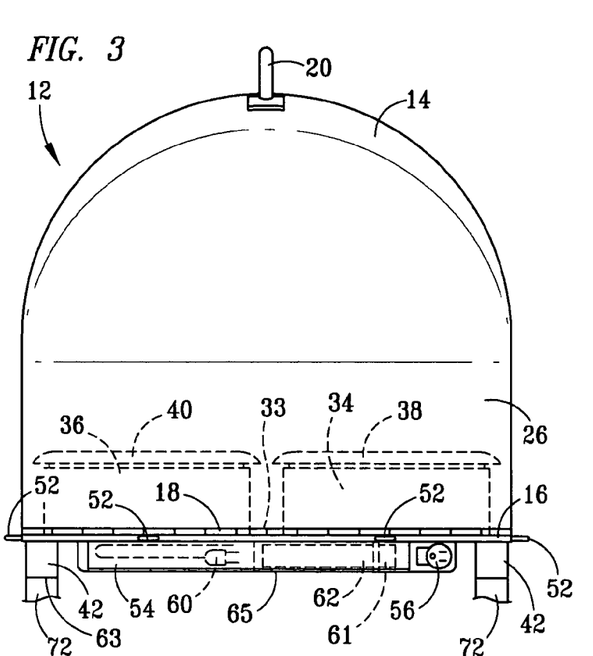
FIG. 3 is a rear, elevation view of the weatherproof pet feeder.

FIG. 3 is a rear, elevation view of the weatherproof pet feeder 12. A storage compartment 54 is provided underneath the feeder section 33 of the feeder base 16, and a power connector 56 is mounted to the storage compartment 54. The storage compartment 54 is preferably one inch to one and one-half inches deep, and disposed a minimum of approximately one inch above the lower end of the support leg sockets 42, such that if the leg sections 72 and the mounting feet 46 are not used, the support leg sockets 42 will support the feeder base 16 with the bottom of the storage compartment 54 disposed a minimum of approximately one inch above the ground surface. The storage compartment 54 has a divider down the center to provide two separate compartments for storing a flexible steel-wrapped power cord 60 and a battery pack 62, such that the power cord 60 may be stored separately from wires and connectors associated with battery pack 62 and the power connector 56. The power cord 60 is preferably a heavy duty, flexible steel-wrapped power cord to help protect it from chewing dogs and the elements, yet can be easily stored in the storage compartment 54, below the feed bowl socket 36. The power cord 60 is used for connecting the power connector 56 to an external power source, such as a conventional household electrical outlet. Preferably, the power cord 60 is stored beneath the feed bowl 40 and the battery pack 62 is stored beneath the heated water bowl 38. A single enclosure cover is preferably provided by a door flap (not shown) which extends the full width of the storage compartment 54, fully enclosing the compartment 54 and covering the electrical power connector 56, which is disposed adjacent to the storage compartment 54. Two more tie down loops 52 are provided on the rearward end of the weatherproof pet feeder 12 for securing the feeder to a ground surface. The storage compartment 54 has a bottom, or lower end 65, and the leg socket 42 has a lower end 63, which is preferably disposed at an elevation which is lower than the lower end 65 of the storage compartment 54.

The weatherproof pet feeder 12 is preferably powered by the battery pack 62 (shown in phantom). The power cord 60 is provided for electrically connecting an external power source, such as a conventional house power electrical outlet, to the weatherproof pet feeder power connector 56. The power connector 56 and the battery pack 62 are preferably connected directly to a control unit 61, which is connected directly to the heating element 58. The control unit 61 preferably includes control circuitry, including a thermostat, for selectively applying electric power from the battery pack 62 to the bowl heater 58 (shown in FIG. 7), and an automatic battery charger for charging the battery pack 62 when the power cord 60 is connected to the external power source. In other embodiments, a battery pack 62 is not included and the weatherproof pet feeder is operated by power supplied from the external power source connected to the weatherproof pet feeder and a thermostat or a thermal switch for controlling application of electric current to the heating element 58 to maintain the temperature in the water bowl 38 above freezing.

Figure 4:
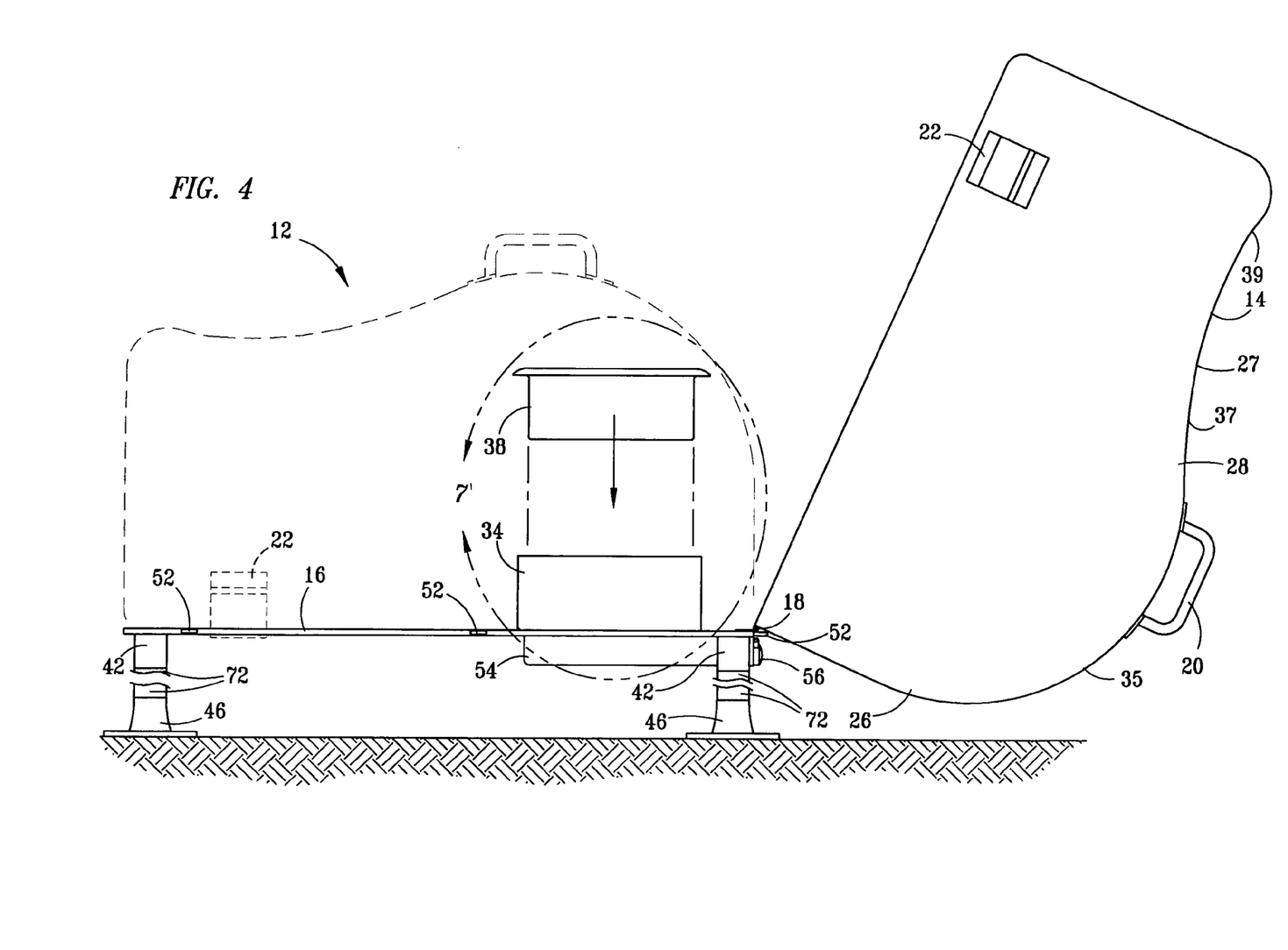
FIG. 4 is a side, elevation view of the weatherproof pet feeder, showing the enclosure in an upward position and a bowl being inserted into the feeder base.

FIG. 4 is a side, elevation view of the weatherproof pet feeder, showing the enclosure 14 in an upward position and the water bowl 38 being inserted into the water bowl socket 34 in the feeder base 16, and showing the enclosure 14 in phantom in a downward position. The latches 22 are released such that the enclosure 14 may be pivoted upward from the feeder base 16, pivoting around the hinge 18. The enclosed rearward end 26 of the enclosure 14 has a substantially convex shape, or rounded shape, defining the ridge 35 for fitting over said feeder section 33, with the rearward ridge 35 of the crest 28 of the top of the exterior surface 27 of the enclosure being higher than the intermediate portion 37 and the forward ridge 39 of the enclosure 14. The upper portion of the enclosed rearward end 26 is rounded to provide head space for a feeding animal, and the rounded portion of the enclosed rearward 26 end extends just beyond a forward end of the feeder section 33. A lower portion at the back of the enclosed rearward end 26 is of a flat shape, extending vertically upward from the hinge 18 to the rounded portion of the enclosed rearward end 26.

Figure 5:
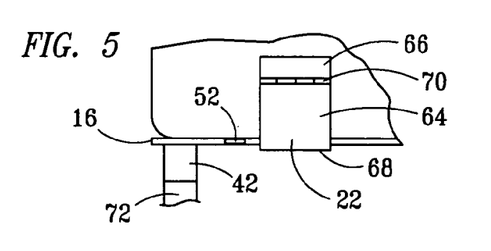
FIG. 5 is a side elevation view of a latch for securing the enclosure in a downward position relative to the feeder base.

FIG. 5 is a side elevation view of one of the latches 22 for securing the enclosure 14 in a downward position relative to the feeder base 16. The latch 22 has a clasp plate 64 which is pivotally mounted to a support bracket 66 by a hinge 70. The lower end 68 of the clasp plate 64 is preferably flanged, to grip the underside of the feeder base 16 to latch the enclosure 14 to the feeder base 16. A lower portion of the clasp plate 64 is pushed inward, to pivot the clasp plate 64 around the hinge 70 and engage the lower end 68 of the clasp plate 64 with the underside of the feeder base 16. Other embodiments may have different types of latches for securing the enclosure 14 to the feeder base 16.

Figure 6:
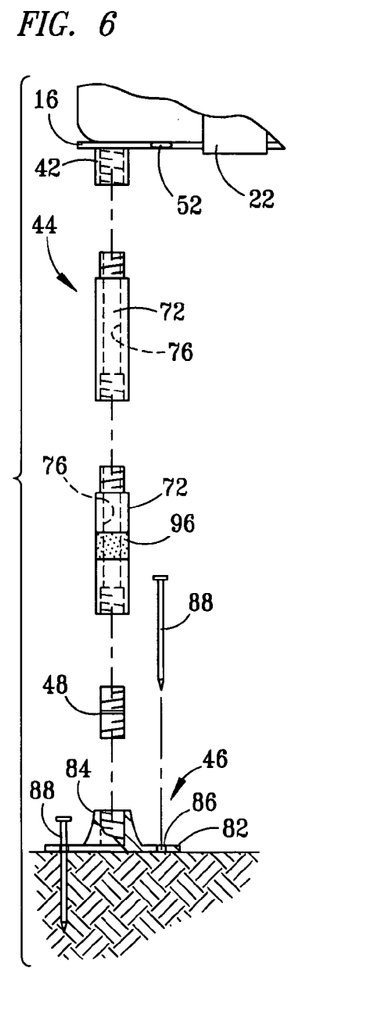
FIG. 6 is an exploded view of one of the support legs of the weatherproof pet feeder.

FIG. 6 is an exploded view of one of the support legs 44 which suspends the feeder base 16 above a ground surface. Preferably, the socket 42 of the feeder base 16 has interior threads for threadingly securing to one of the support legs 44 to the feeder base 16. The support leg 44 is shown as including two leg sections 72. Preferably, the leg sections 72 have a diameter of two and one-half inches, and an overall, longitudinal length of each of the leg sections 72 is eight inches. The made-up length the leg sections 72 is preferably six inches, such that one of the leg sections 72 will add six inches to the height of the feeder base 16. The leg sections 72 are preferably formed of a tubular material, such that they have interior passages 76 which define interior chambers for the support legs 44. Upper ends of the leg sections 72 are preferably exteriorly threaded to define male threaded connector ends for threadingly securing to respective leg sockets 42 of the feeder base 16, or to interior threads located within lower ends of the leg sections 72. The lower ends of the leg sections 72 have interior threads to define female threaded connectors. Nipple 48 has opposite ends with exterior threads for threadingly securing to interior threads of the lower ends of leg sections 72, or to interior threads of the mounting feet 46.

The nipple 48 has a solid divider member located within the nipple 48, such that the nipple provides a seal member for containing weighing material within interior passages 76 of the leg sections 72 of the support legs 44. The weighting material may be sand, or other suitable materials, to weight the support legs 44 to prevent feeding animals from tipping over the weatherproof pet feeder 12. In some embodiments, the nipple may have an upper exterior threaded end for threadingly securing to the interior threaded lower ends of leg sections 72, and have a solid bottom lower end. In other embodiments, friction couplings with an interference fit may be used rather than threaded couplings for securing the leg sections 72 together, to the socket 42, and to the mounting feet 46. The mounting feet 46 include flange portions 82 which have apertures 86 for receiving stakes 88, which secure the mounting feet 46 to a ground surface. Internal threads in a socket portion 84 of the mounting feet 46 receive the external threads of nipple 48, which is connected to the support legs 44. In other embodiments, the internal threads in the socket portion of the mounting feet 46 may be absent and the mounting feet 46 receive a solid bottom seal member which is secured to the support legs 44 for containing a weighting material. The height of the mounting feet 46 is preferably two and one-half inches.

The length of the support legs 44 and the height of the feeder base 16 above the surface of the ground are selected to accommodate animals of various heights. The length of one of the support legs 44 is determined by selecting the quantity of leg sections 72 included in the leg support. Extra leg sections 72 may be purchased in addition to the two sets of leg sections 72 for each of the four support legs 44 which are included as standard with the weatherproof pet feeder 12. Some embodiments may have leg sections 72 of different length, which will locate the feeder base 16 at other heights above the ground surface. For large animals, more than two leg sections 72 may be included in the support legs 44. Alternately, the feeder base may also be used without the support legs, which will provide the feeder base 16 with a height of two and one-half inches above the ground surface.

Figure 7:
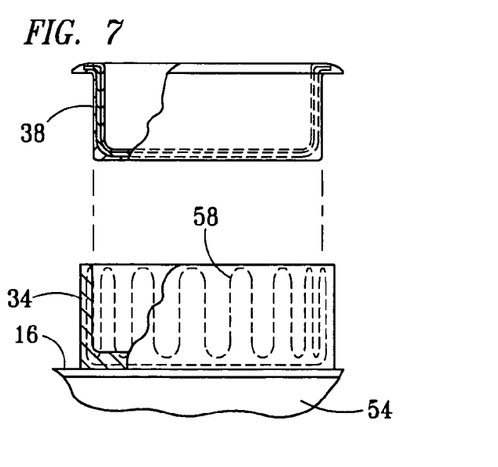
FIG. 7 is a partial section view of the feeder base, a bowl socket and a water bowl, taken along Section Line 7—7 of FIG. 4.

FIG. 7 is a partial section view of the feeder base 16, the bowl socket 34 and the water bowl 38, taken along Section Line 7—7 of FIG. 4. The bowls 38 and 40 are preferably formed of stainless steel which is coated with a plastic, such as Teflon®, but other suitable materials may be used. The removable water bowls 38 and 40 have large, curved brims that overlap and wrap over rims of the bowl sockets 34 and 36, and which are three inches high for fitting into the bowl sockets 34 and 36. Low profile bowls may be purchased separately for smaller dogs, puppies and kittens. A heating element 58 (shown as a hidden line) is mounted interiorly within the bowl socket 34 which receives the water bowl 38, preferably molded into the bowl socket 34. The bowl socket 34 is sealed, such that the bowl 38 may be removed when heating element 58 is in use and water may be placed directly in the bowl socket 34 encasing the heating element 58, such that water for the pet will be contained within the bowl socket 34 rather than the separate water bowl 38. The heating element 58 provides heat for preventing water in the bowl 38 from freezing when exposed to cold ambient temperatures. The heating element 58 is preferably formed into a cage-type configuration with an open upper end for receiving the water bowl 38. The heating element 58 preferably extends along the bottom and the sides of the bowl socket 34. In the preferred embodiment, the power connector 56 and the battery pack 62 are connected to the control unit 61, which connects the power connector 56 and the battery pack 62 to the heating element 58. The control unit 61 includes a temperature regulator and applies electric current from the battery pack 62 to the heating element 58 to control the temperature of the water in the bowl 38, such that the water stored in the bowl 38 will not freeze. The control unit 61 also preferably includes an automatic battery charger for recharging the storage batteries of the battery pack 62 when the power connector 56 is connected to an external power source, such as a household electrical outlet.

In other embodiments, the enclosure 14 may be removably secured to the feeder base 16 with releasable latches, and may also be pivotally secured to the feeder base 16 with a hinge that is not easily disassembled rather than with the hinge 18. Additionally, the feeder base 16 may be provided with through holes for receiving water and feed bowls 38 and 40, rather than the upwardly extending sockets 36 and 38. The brims which circumferentially extend from the container portions of the bowls 38 and 40 are preferably sized to extend for retaining the water and feed bowls 38 and 40 within the holes in the feeder base 16. Preferably, the enclosure 14 and the feeder base 16 are formed of shatterproof plastic, but in other embodiments may be formed of metal. In other embodiments, the front ridge and front overhang may not be included.

The weatherproof pet feeder of the present invention provides several advantages over prior art pet feeders. The weatherproof pet feeder has a feeder section which provides feed and water underneath an enclosure which provides a cover for the feeder section. The enclosure is pivotally mounted to a base section of the weatherproof pet feeder, and may be raised to access the feeder section. An entrance section is provided in the forward end of the enclosure to allow passage of animals into within the weatherproof pet feeder. The weatherproof pet feeder is provided with support legs which may be provided at various heights by selecting the quantity of leg sections included in the support legs. Insecticide bands are provided on the support legs to prevent crawling insects from infesting the feed and water placed in feeder bowls of the weatherproof pet feeder. A heater is provided to prevent freezing of water being stored in the weatherproof pet feeder.

Although the preferred embodiment has been described in detail, it should be understood that various changes, substitutions and alterations can be made therein without departing from the spirit and scope of the invention as defined by the appended claims.

What is claimed is:

1. A weatherproof pet feeder for placing outdoors to provide feed and water for a small animal, the weatherproof pet feeder comprising:
   a feeder base having an entrance section with an open forward end for receiving the animal, and a feeder section which the animal accesses after walking into the entrance section of the feeder base;
   wherein said feeder base has a substantially planer shape which is horizontally disposed, said entrance section being defined by an entrance slot which extends into said substantially planar shape and defines a U-shaped entrance, said entrance slot extending into said feeder base approximately two-thirds of a longitudinal length of said feeder base;
   support legs extending downward from said feeder base to a ground surface and suspending said feeder base above the ground surface;
   an enclosure having a front opening for receiving the animal and an enclosed rearward end, said enclosure fitting over said entrance section and said feeder section of said feeder base, with said front opening registering with said open forward end of said entrance section of said feeder base and said enclosed rearward end enclosing said feeder section of said feeder base; and
   means for securing said enclosure to said feeder base, such that said enclosure is moveable relative to said feeder base for accessing said feeder section.

2. The weatherproof pet feeder according to claim 1, wherein said enclosure has an exterior surface with a top defining a crest which extends from said enclosed rearward end to said front opening, said crest having a rearward ridge defined atop said closed rearward end and a forward ridge disposed adjacent to said front opening, and said crest sloping downward from said rearward ridge and downward from said forward ridge to an intermediate portion, disposed between said forward ridge and said rearward ridge.

3. The weatherproof pet feeder according to claim 1, wherein said feeder section includes two bowl sockets for receiving a feed bowl and a water bowl, respectively.

4. The weatherproof pet feeder according to claim 3, wherein said feeder section of said feeder base includes a heating element disposed with one of said bowl sockets for warming a water bowl when received within said one of said bowl sockets.

5. The weatherproof pet feeder according to claim 4, wherein said heating element is an electric heating element, and said weatherproof pet feeder further comprises a battery pack mounted to said feeder base for powering said electric heating element.

6. The weatherproof pet feeder according to claim 1, wherein said means for securing comprises a hinge which pivotally secures said enclosure to said feeder base, said hinge having a plurality of hinge loops with a first portion of said hinge loops extending from said enclosure and a second portion of said hinge loops extending from said feeder base, and a removable pin which extends within said hinge loops to pivotally secure first portion of said hinge loops to said second portion of said hinge loops, and said means for securing further comprises a latch for releasibly securing said enclosure in a downward position relative to said feeder base.

7. The weatherproof pet feeder according to claim 1, wherein said support legs include leg sections and mounting feet, with said leg sections being coupled to said mounting feet and said feeder base, and a quantity of said leg sections used in each of said support legs being selectively determined to select overall lengths of respective ones of said support legs.

8. The weatherproof pet feeder according to claim 7, wherein said leg sections include insecticide bands which comprise strips of absorbent material which are adhesively secured to respective ones of said support legs between the ground surface and said feeder base, said absorbent strips being treated with an insecticide.

9. The weatherproof pet feeder according to claim 7, wherein said leg sections of said support legs are of tubular shape, and said support legs further comprise seal members for securing to lower ends of respective ones of said leg sections for securing weighting material within said leg sections.

10. The weatherproof pet feeder according to claim 9, wherein said legs sections further include mounting feet, and said mounting feet have apertures for receiving stakes to secure said mounting feet and said feeder base to the ground surface; and
   said feeder base has a plurality of tie down loops for securing said feeder base in position relative to the ground surface.

11. A weatherproof pet feeder for placing outdoors to provide feed and water for a small animal, the weatherproof pet feeder comprising:
   a feeder base having a substantially planer shape which is horizontally disposed, said substantially planar shape having an entrance section defined by an entrance slot which extends into said substantially planar shape and defines a U-shaped entrance, said entrance slot extending into said feeder base approximately two-thirds of a longitudinal length of said feeder base, and said feeder base having a feeder section having two bowl sockets for receiving a feed bowl and a water bowl, respectively, wherein the animal accesses said feeder section after walking into the entrance section of the feeder base;

an enclosure having a front opening for receiving the animal and an enclosed rearward end, said enclosure fitting over said feeder base, with said front opening registering with said entrance slot and said enclosed rearward end covering said feeder section of said feeder base;

said enclosure having an exterior surface with a top defining a crest which extends from said enclosed rearward end to said front opening, said crest having a rearward ridge defined atop said closed rearward end and a forward ridge disposed adjacent to said front opening, and said crest sloping downward from said rearward ridge and downward from said forward ridge to an intermediate portion, disposed between said forward ridge and said rearward ridge;

means for securing said enclosure to said feeder base, such that said enclosure is moveable relative to said feeder base for accessing said feeder section; and support legs extending downward from said feeder base to a ground surface.

12. The weatherproof pet feeder according to claim 11, wherein said means for securing comprises a hinge which pivotally secures said enclosure to said feeder base, said hinge having a plurality of hinge loops with a first portion of said hinge loops extending from said enclosure and a second portion of said hinge loops extending from said feeder base, and a removable pin which extends within said hinge loops to pivotally secure first portion of said hinge loops to said second portion of said hinge loops.

13. The weatherproof pet feeder according to claim 11, wherein said feeder section of said feeder base includes an electric heating element disposed with one of said bowl sockets for warming a water bowl when received within said one of said bowl sockets.

14. The weatherproof pet feeder according to claim 11, wherein said support legs include leg sections and mounting feet, with said leg sections being coupled to said mounting feet and said feeder base, and a quantity of said leg sections used in each of said support legs being selectively determined to select overall lengths of respective ones of said support legs.

15. The weatherproof pet feeder according to claim 14, wherein said leg sections of said support legs are of tubular shape, and said support legs further comprise seal members for securing to lower ends of respective ones of said leg sections for securing weighting material within said leg sections.

16. The weatherproof pet feeder according to claim 15, further comprising said feeder base having tie down loops for securing said feeder base in position relative to the ground surface;

said mounting feet have apertures for receiving stakes to secure said mounting feet and said feeder base to the ground surface; and said leg sections include insecticide bands which comprise strips of absorbent material which are adhesively secured to respective ones of said support legs between the ground surface and said feeder base, said absorbent strips being treated with an insecticide.

17. A weatherproof pet feeder, comprising:

a feeder base having a horizontally disposed, generally planar shape, an entrance section with an open forward end defined by a slot which extends approximately two-thirds of a longitudinal length of said feeder base into said planar shape of said feeder base to a feeder section, said entrance section to have a generally U-shape with opposite sides of said open forward end ranging from one and one-half inches to two inches in width;

said feeder section of said feeder base extending approximately one-third of said longitudinal length of said feeder base and disposed at a rearward end of said feeder base, said feeder section including a feed bowl socket and a water bowl socket which extend upward from a horizontal plane defined by said generally planar shape of said feeder base for approximately three inches, said feed bowl socket and said water bowl socket extending across a width of most of said feeder section;

two plastic coated stainless steel bowls having large curved brims that overlap respective ones of rims of said feed and water bowl sockets, said bowls being approximately three inches tall and removably fitting snugly into said feed and water bowl sockets;

an electric heating element disposed proximate to one of said feed and water bowl sockets, wherein said heating element is a cage-like heating element which is encased in one of said bowl sockets, and said bowl socket being sealed for containing water therein such that said one of said bowl sockets may be used for storing water, and said electric heating element is disposed on sides and a bottom of said one of said bowl sockets;

an enclosure fitting over said entire feeder base, said enclosure having a front opening and an enclosed rearward end, said enclosed rearward end being of a substantially rounded shape for fitting over said feeder section, and said enclosed rearward end being higher than a forward portion of an upper surface of said enclosure and being rounded for providing head space for a feeding animal, and a rearward portion of said enclosed rearward of said enclosure being extending vertically and being of a substantially flat shape;

said upper surface of said enclosure having a top which defines a crest which includes two ridges, a first one of said two ridges disposed above said feeder section and adjacent to said enclosed rearward end and extending forward toward said open forward end, leveling out to a second one of said two ridges, and said second one of said two ridges rising to an uppermost surface of said open forward end, and curving downward and forming an overhang at a front opening of said enclosure, said overhang extending downward from said uppermost surface of said open forward end approximately two inches to form a top portion of said front opening of said enclosure;

a grip handle disposed on said upper surface of said enclosed rearward end, said grip handle being formed of plastic into a round bar with one-inch curved ends which elevate said grip handle one inch from said upper surface to provide a hand grip, and being approximately between three to four inches long, said grip handle running lengthwise with a length of said enclosure and said feeder base, and being positioned on a rearward end of said crest defined by said top of said exterior surface of said enclosure;

said latches being disposed one on each side of said enclosure, toward a forward end of said enclosure, and having lower ends which are flanged to grip an underside of said feeder base;

an electric power cord being a heavy duty flexible steel-wrapped power cord;

a power connector adjacent to said storage compartment, and connects heating element to power source via power cord;

a battery pack-stored in side of storage compartment under water bowl socket for providing alternative electrical power to said heating element encased in the water bowl socket so that power cord maybe stored away in storage compartment;

a control unit connecting said battery pack to said heating element, said control unit including a temperature regulator for maintaining a temperature of the water in said one of said bowl sockets above 32 degrees F.;

a storage compartment disposed beneath said feeder section of said feeder base, said storage compartment having a middle divider to define two sections of said storage compartment, a first one of said two sections being disposed beneath said feed bowl socket for storing said electric power cord, and a second one of said two compartments disposed beneath said water bowl socket and storing said battery pack;

a storage compartment door covering both said first and second sections of said storage compartment and said power connector disposed adjacent to said storage compartment, said storage compartment door extending across said width of a rearward end of said feeder base;

said storage compartment being one inch to one and one-half inches tall and disposed at least one inch above a ground surface;

a hinge having a first set of loops disposed on said rearward portion of said enclosure and a second set of hinge loops disposed on a rearward end of said feeder base, said first and second loops inter-fitting and extending around a hinge pin which extends along said width of said feeder base, said hinge pin being removable such that said enclosure can be disconnected from said feeder base, wherein said hinge and said hinge pin extend for a complete width of said rearward end of said feeder base and said enclosure;

tie down loops extending from said feeder base, wherein respective ones of said tie down loops are disposed on each side of a forward end of said feeder base, respective ones of said tied down loops are disposed on each side of feeder base proximate to said feeder section, and two of said tie down loops are disposed on a rearward end of said feeder base;

said feeder base including support leg sockets disposed at each corner of said feeder base, said support leg sockets extending two and one-half inches beneath a main body portion of said feeder base and said support leg sockets being two and one-half inches in diameter, said support leg sockets having interior threads for threadingly securing said support legs thereto, wherein said support leg sockets elevate said feeder base approximately two and one-half inches above a ground surface;

said support legs having leg sections, nipples with center dividers that serve as end seals, and wide-based mounting feet with two and one-half inch high tubular portions and apertures for receiving stakes, said leg sections being tubular-shaped and having interior passages for holding a weighting material, upper ends of said leg sections having exterior threads for threadingly securing to respective ones of said support sockets of said feeder base and threadingly securing to interior threads of a lower end of an adjacent leg section, and lower ends having interior threads for threadingly securing to exterior threads of an upper end of an adjacent leg section and to exterior threads of nipple, and wherein said leg sections are preferably no longer than eight inches tall and two and one-half inches in diameter;

said nipples having exterior threaded upper end sections for securing to internal threaded lower ends of leg sections, and exterior threaded lower end sections for securing to interior threaded tubular portion of mounting feet, and center dividers providing end seals to seal a weighting material within said leg sections;

said wide-base mounting feet having a wide-based solid bottom, interior threads inside a tubular portion thereof for receiving exterior threads of said nipples, apertures for receiving said stakes, formed as one continuous piece, and said mounting feet being two and one-half inches tall and a two and five-eighths inch diameter tubular portion;

said stakes being three inches long, and inserted through apertures in said mounting feet and into a ground surface for securing said mounting feet to the ground surface; and insecticide bands formed of strips of absorbent material two inches wide, eight and one-quarter inches long, and one-eighth inch thick, wherein said absorbent material of said insecticide bands is impregnated with insecticide and an adhesive backing is applied to one side of said absorbent material, and a wax-like paper protective backing is secured against said adhesive backing for removal prior to said insecticide bands being installed onto respective ones of said support legs, and wherein said insecticide bands are installed to said support legs by wrapping said insecticide bands around said support legs to prevent insects from contaminating feed and water disposed in said feeder section.

18. The weatherproof pet feeder according to claim 17, further comprising three-quarter inch tall low profile bowls, formed of plastic coated stainless steel, or other suitable material, for feeding smaller animals.

19. The weatherproof pet feeder according to claim 17, wherein said enclosure is formed of unbreakable plastic, preferably of colors which are of a clear or light tinted shades such that the amount of water and feed remaining in said feeder section may be visually inspected through said enclosure.

20. The weatherproof pet feeder according to claim 17, wherein said feeder base, including bowl sockets, are formed of one-fourth inch to one-half inch hard, colored plastic capable of withstanding low, direct heat.

* * * * *